United States Patent
He (10) Patent No.: US 10,168,179 B2
(45) Date of Patent: Jan. 1, 2019

(54) VEHICLE DISPLAY SYSTEM AND METHOD WITH ENHANCED VISION SYSTEM AND SYNTHETIC VISION SYSTEM IMAGE DISPLAY

(75) Inventor: Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1936 days.

(21) Appl. No.: 11/698,119

(22) Filed: Jan. 26, 2007

(65) Prior Publication Data

US 2008/0180351 A1 Jul. 31, 2008

(51) Int. Cl.
*G01C 23/00* (2006.01)
*G08G 5/00* (2006.01)

(52) U.S. Cl.
CPC .......... *G01C 23/00* (2013.01); *G08G 5/0021* (2013.01); *G08G 5/0052* (2013.01); *G08G 5/0078* (2013.01); *G08G 5/0086* (2013.01)

(58) Field of Classification Search
CPC .. G09G 3/20; G09G 2354/00; G09G 2354/12; G01C 23/00; G08G 5/0086; G08G 5/0078; G08G 5/0021; G08G 5/0052
USPC .......................................................... 345/1.1
See application file for complete search history.

(56) References Cited

U.S. PATENT DOCUMENTS

| | | | |
|---|---|---|---|
| 5,604,849 A * | 2/1997 | Artwick et al. ............... 345/423 |
| 5,640,165 A * | 6/1997 | Hui et al. ...................... 342/185 |
| 6,061,068 A | 5/2000 | Hoffman, II et al. |
| 6,130,705 A * | 10/2000 | Lareau et al. ................. 348/144 |
| 6,166,744 A * | 12/2000 | Jaszlics et al. ............... 345/629 |
| 6,985,091 B2 * | 1/2006 | Price ............................. 340/975 |
| 2002/0069019 A1 * | 6/2002 | Lin ................................ 701/301 |
| 2003/0193562 A1 * | 10/2003 | Corzillus ...................... 348/148 |
| 2003/0229441 A1 * | 12/2003 | Pechatnikov et al. ........ 701/201 |
| 2005/0099433 A1 | 5/2005 | Berson et al. |
| 2005/0232512 A1 | 10/2005 | Luk et al. |
| 2005/0244033 A1 * | 11/2005 | Ekin et al. .................... 382/103 |
| 2006/0005136 A1 * | 1/2006 | Wallick ................ H04M 9/082 715/726 |
| 2006/0247855 A1 * | 11/2006 | de Silva et al. .............. 701/212 |

OTHER PUBLICATIONS

Chad Jennings et al., "Synthetic Vision as an Integrated Element of an Enhanced Vision System," Nav3D Corporation, Palo Alto, CA, and The Boeing Company, St. Louis, MO and Long Beach, CA.
EP Examination Report for Application No. 08100786.6 dated Oct. 7, 2014.
EP Extended Search Report for Application No. EP 08100786.6 dated Jul. 16, 2014.

* cited by examiner

*Primary Examiner* — Jonathan R Horner
(74) *Attorney, Agent, or Firm* — Lorenz & Kopf, LLP (57) ABSTRACT

A vehicle display system displays enhanced vision (EV) and synthetic vision (SV) images to an operator of a vehicle. The display system includes: an EV vision image sensor for generating EV images; an SV database containing information regarding terrain and objects of interest for a travel path of a vehicle; an SV image generating unit for generating SV images based on travel of the vehicle and information from the SV database; an EV image sensor control unit for controlling a field of view of the EV image sensor as a function of object of interest information from the SV database; and a display for displaying images generated by said EV image sensor and the SV image generating unit.

20 Claims, 9 Drawing Sheets

VEHICLE DISPLAY SYSTEM AND METHOD WITH ENHANCED VISION SYSTEM AND SYNTHETIC VISION SYSTEM IMAGE DISPLAY

FIELD OF THE INVENTION

The present invention relates to vehicle display systems, and more particularly to a vehicle display system and method with both enhanced vision system and synthetic vision system images.

BACKGROUND OF THE INVENTION

An enhanced vision (EV) system, e.g., which uses an infrared (IR) and/or millimeter wave (MMW) video camera, provides a vehicle operator, such aircraft crew, with the ability to see in reduced visibility conditions. EV images, however, are often difficult to interpret and may suffer from deterioration under various weather conditions. Due for example to the sensing of a thermal signature rather than a visual optical view, EV images containing particular features/objects of interest may be overwhelmed by other image areas. Although image processing can improve image quality, image enhancement performed over the entire EV image may not lead to a better display of regions of interest.

A synthetic vision (SV) system can provide useful information to the vehicle crew by rendering an image based on pre-stored database information, including terrain and objects/obstructions, so that the operator can visualize essential terrain and flight path information that may be outside of the view of the EV system or not clearly shown in EV images. Thus, SV images can provide the vehicle operator with an effective interface for vehicle control. SV image integrity, however, is limited by the integrity of the information pre-stored in the database. Incomplete and/or outdated database information can result in SV images of limited value. Although an operator display may include both an SV image display and an EV image display, e.g., as a fused image (such as overlaying a semi-transparent EV image onto an SV image) or as a side-by-side display, such an "enhanced synthetic vision system" display does not adaptively aid the vehicle operator in quickly recognizing particular regions of interest.

SUMMARY OF THE PRESENT INVENTION

According to one aspect, the present invention is a vehicle display system for displaying enhanced vision (EV) and synthetic vision (SV) images to an operator of a vehicle. The system comprises: an EV image sensor for generating EV images; an SV database containing information regarding terrain and objects of interest, such as navigational targets, waypoints, obstructions, areas to avoid, etc., for a travel path of a vehicle; an SV image generating unit for generating SV images based on travel of the vehicle and information from the SV database; an EV image sensor control unit for controlling a field of view of the EV image sensor as a function of object of interest information from the SV database; and a display for displaying EV images generated by the EV image sensor and the SV image generating unit.

According to another aspect, the present invention is a vehicle display system for displaying enhanced vision (EV) and synthetic vision (SV) images to an operator of a vehicle. The system comprises: an EV image sensor for generating EV images; an SV database containing information regarding terrain and objects of interest for a travel path of a vehicle; an SV image generating unit for generating SV images based on travel of the vehicle and information from the SV database; an EV image enhancement control unit for controlling an enhancement area for EV images generated by the EV image sensor as a function of object of interest information from the SV database; and a display for displaying EV images generated by the EV image sensor and the SV image generating unit.

According to yet another aspect, the present invention is a method for displaying enhanced vision (EV) and synthetic vision (SV) images to an operator of a vehicle. The method comprises: generating EV images using an EV image sensor; accessing an SV database containing information regarding terrain and objects of interest for a travel path of a vehicle; generating SV images based on travel of the vehicle and information accessed from the SV database; controlling a field of view of the EV image sensor or an enhancement area for an EV image generated the EV image sensor as a function of object of interest information from the SV database; and a display for displaying images generated by the EV image sensor and the SV image generating unit.

BRIEF DESCRIPTION OF THE DRAWINGS

The present invention will become more fully understood from the detailed description given hereinafter and the accompanying drawings that are given by way of illustration only, and thus do not limit the present invention.

DETAILED DESCRIPTION

Figure 1:
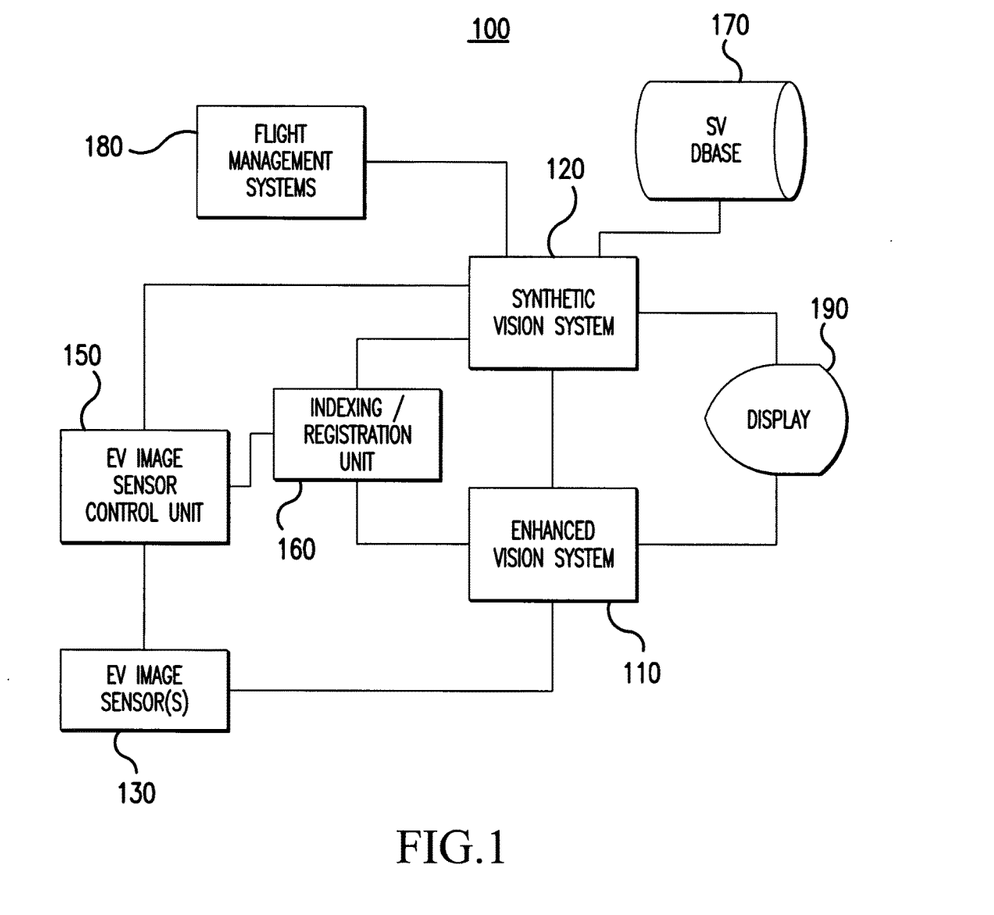
FIG. 1 is a block diagram of a vehicle display system for generating SV and EV display images according to a first embodiment of the present invention.

Embodiments of the present invention will now be described with reference to the accompanying drawings. Although embodiments described herein are specific to aircraft display systems, it should be recognized that principles of the present invention may be applied to other vehicle display systems. FIG. 1 illustrates a vehicle display system 100 according to a first embodiment of the present invention. As illustrated in FIG. 1, the vehicle display system 100 includes: a synthetic vision (SV) system 120; an enhanced vision (EV) system 110; an SV database 170; flight management systems 180; enhanced vision (EV) image sensor(s) 130; a display 190; an indexing/registration unit 160; and an EV image sensor control unit 150. Although various block diagram elements shown in FIG. 1 are illustrated as discrete elements, this illustration is for use and explanation, and it should be recognized that certain elements may be combined in one or more physical devices, e.g., one or more microprocessor(s) with associated software.

Figure 2:
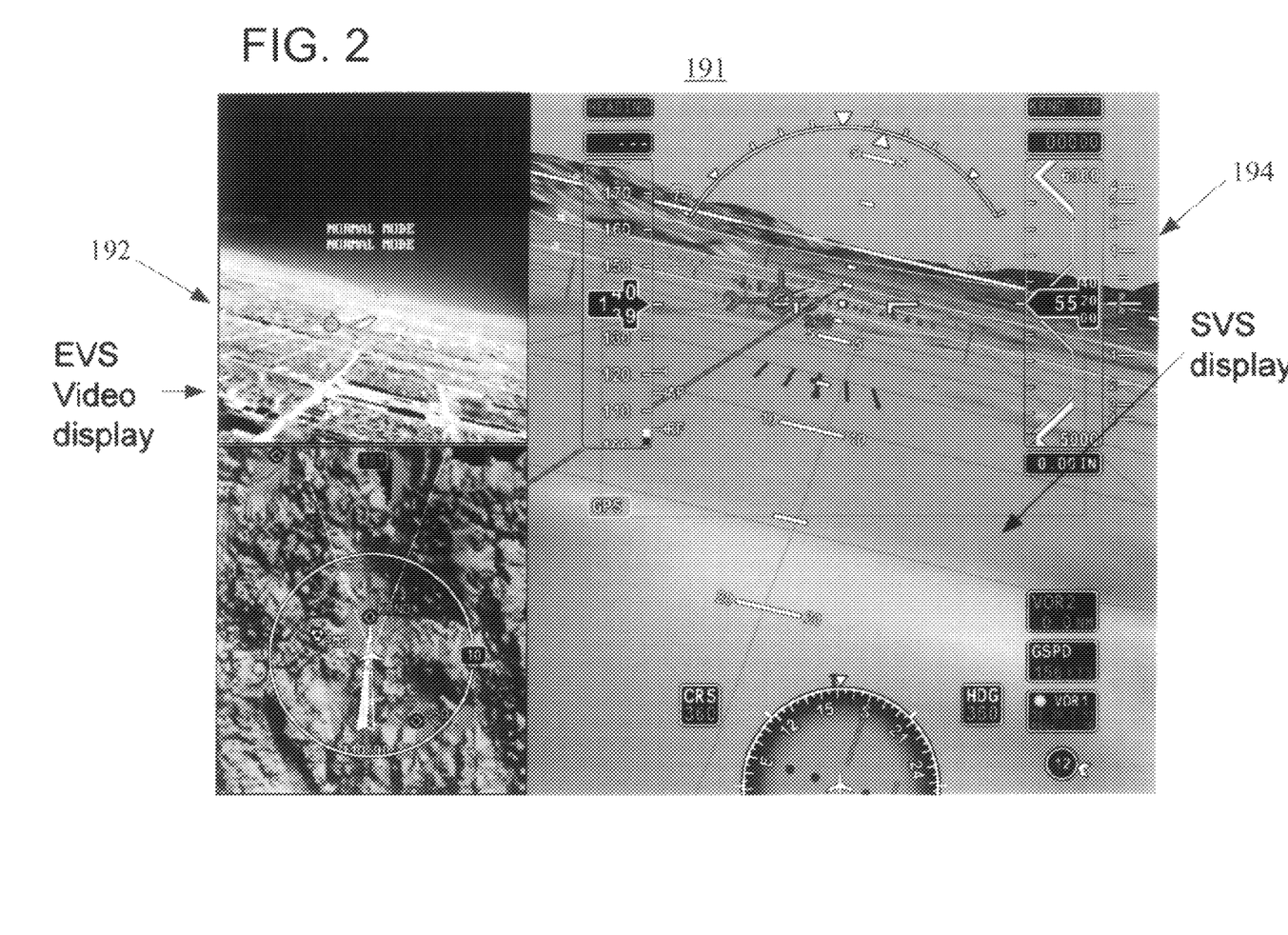
FIG. 2 is an exemplary vehicle display of EV and SV images according to principles of the present invention.

The enhanced vision system 110 generates an image for display on the display 190 based on the output of one or more of the EV image sensors 130, e.g., IR and/or MMW video cameras. In one embodiment of the present invention, at least one EV image sensor 130 is a steerable EV camera with a narrow field of view. For example, the EV image sensor 130 in one implementation of this embodiment is a zoomed camera with a viewing angle of several degrees, allowing a closer look at a specific object of interest. The synthetic vision system 120 renders an image based on pre-stored terrain, objects of interest, obstructions, etc. and navigation information stored in the SV database 170 for output to the display 190. The synthetic vision system 120 also generates the SV images based on information from flight management systems 180, such as vehicle positioning, heading, attitude, flight plan, etc. FIG. 2 illustrates an exemplary display output 191 on the display 190, including an EV sensor image 192 and an SV image 194. The images may be indexed at the time of camera installation, e.g., by aligning the EV image sensor 130 to ensure that the sensor and the SV view are indexed. Such a process may be periodically repeated to assure proper alignment during normal course of maintenance. In the exemplary display of FIG. 2, the EV image 192 is an IR image and the SV image 194 includes flight management data (heading, altitude, speed, etc.) superimposed on the synthetic rendering of terrain and an object of interest (runway).

Figure 3:
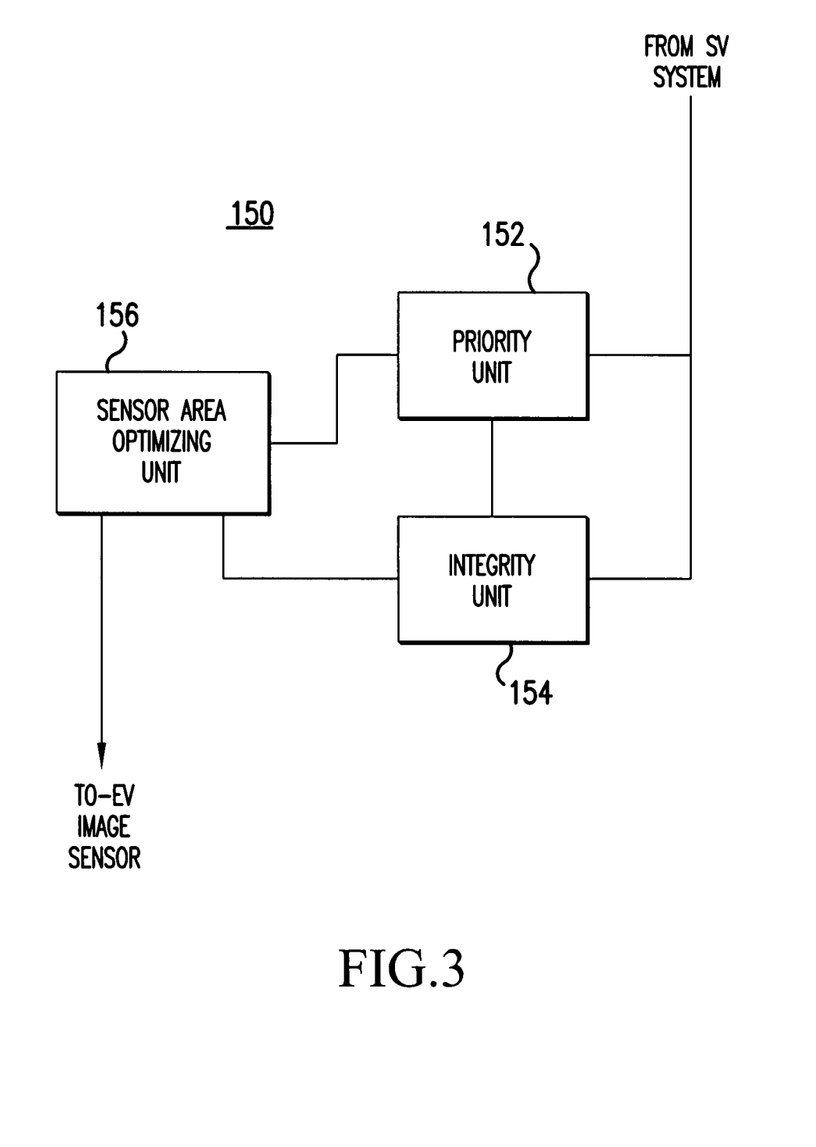
FIG. 3 is a block diagram of an EV image sensor control unit utilized in the vehicle display system of FIG. 1 according to the first embodiment of the present invention.

FIG. 3 is a block diagram illustrating elements of the image sensor control unit 150 according to the first embodiment of the present invention. As illustrated in FIG. 3, the image sensor control unit 150 includes a priority unit 152; integrity unit 154; and a sensor area optimizing unit 156. The priority unit 152 determines the priority of certain objects of interest based on information from the SV system 120. Since the EV image sensor 130 in this embodiment has a small field of view, it may be unlikely that multiple objects of interest can be viewed in the same image. Therefore, the priority level determines which object of interest will be viewed first by steering the EV image sensor 130 toward that object of interest. The object of interest may be within the SV display area or may be outside the SV display area. For example, this may become necessary in instances where the pilot must fly the aircraft and maintain proper control, using the SV display, while searching for an object of interest using the EV image sensor 130.

The integrity levels are assigned to object of interest data, for example using either an on-board database or uploaded data associated with a real-time datalink. The integrity level represents the confidence level for the object of interest data. For example, for an object of interest with high integrity, the area to zoom in on and search for the object of interest can be very limited, allowing quicker recognition of objects of interest. The integrity unit 154 determines the integrity level of objects of interest based on information from the SV system 120.

Figure 4:
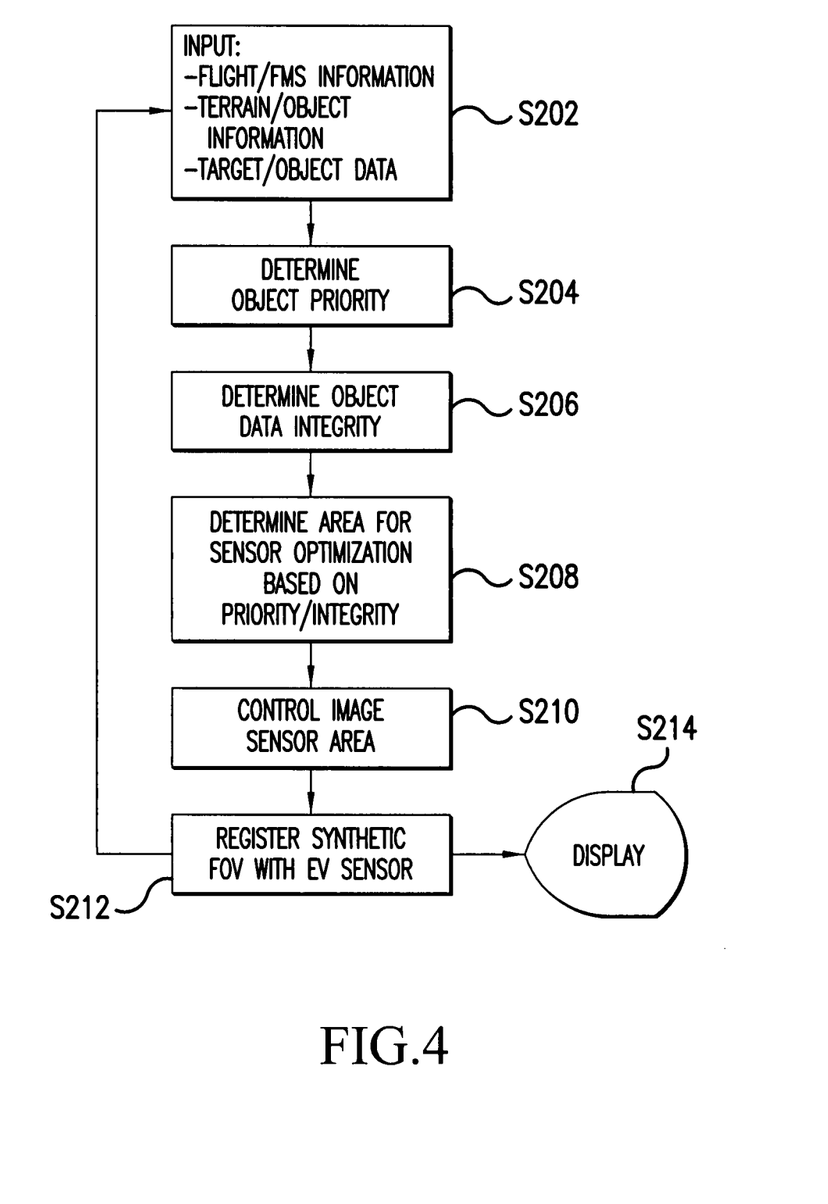
FIG. 4 is a flow diagram illustrating a process for generating a vehicle display with EV and SV images according to the first embodiment of the present invention.

Next, operation of the vehicle display system 100 according to the first embodiment illustrated in FIG. 1 and FIG. 3 will be described with reference to the flow diagram of FIG. 4. Initially, the synthetic vision system 120 inputs flight and flight management system (FMS) information, including for example aircraft position, heading, attitude, flight plan, etc. from the flight management systems 180 (step S202). In general, flight information refers to the state of the aircraft, such as present altitude, speed, pitch, roll and position, while the FMS information concerns more strategic flight information, such as planning, routing, etc. Based on this information, the priority unit 152 of the image sensor control unit 150 determines object priority. (step S204). Such a priority will be application dependent and dynamic. For example, a threat such as impending terrain, obstruction, traffic, or enemy weapon location will be assigned high priority levels. For a task of landing an aircraft onto a runway, the runway will receive high priority when no immediate safety threat is present.

The integrity unit 154 of the EV image sensor control unit 150 assigns integrity levels to objects of interest. (step S206). Based on the assigned integrity, the sensor area optimizing unit 156 of the image sensor control unit 150 assigns a imaging area within the field of view of the synthetic vision system 120 (step S208). The level of zooming is controlled by data integrity with human operator override. The EV image sensor control unit 150 outputs steering control signals to at least one EV image sensor 130 based on the assigned search area (step S10). In this way, the EV image sensor 130 can be selectively controlled to effectively image an object or area of interest based on information from the SV system 120. The size of the area for camera steering is a function of object integrity as determined by the integrity unit 154 of the EV image sensor control unit 150, thereby providing a more useful display to the operator. The indexing/registration unit 160 indexes and aligns the images generated by the EV system 110 and the SV system 120 for output to the display 190 (steps S212, S214).

Figure 5A:
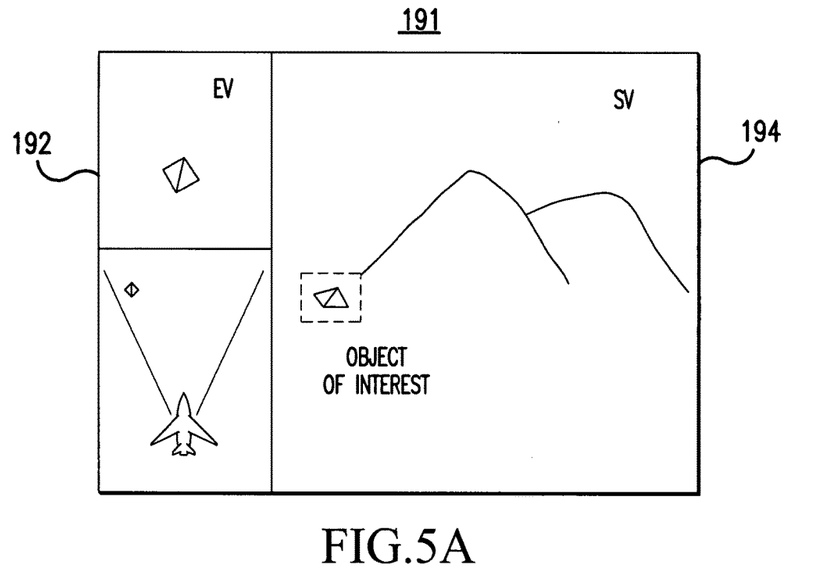
FIGS. 5A and 5B are exemplary vehicle displays with combined EV and SV images according to the first embodiment of the present invention.
Figure 5B:
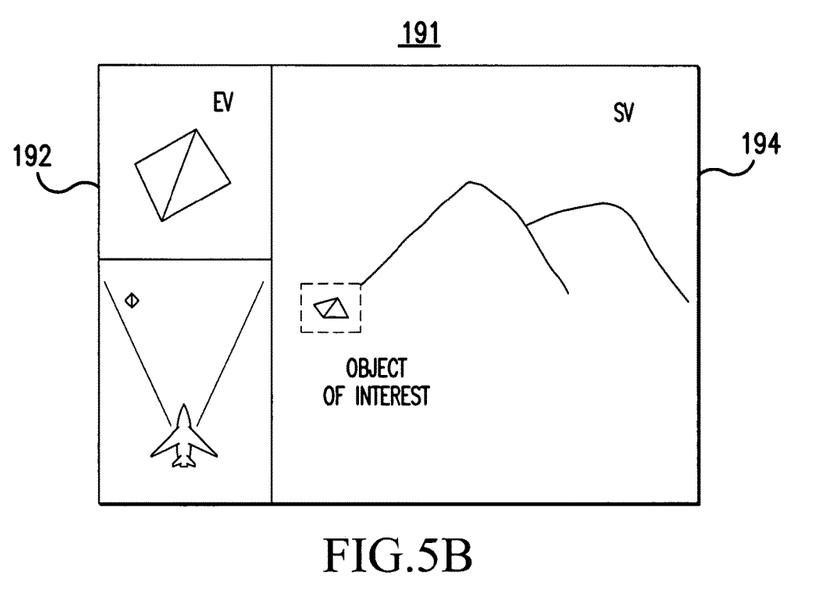

FIGS. 5A and 5B illustrate exemplary images output to the display 190 in accordance with a first embodiment of the present invention. In the display image 291, an EV display image 292 (e.g., video display) has a field of view that has been controlled as a function of the integrity level assigned to objects of interest of the SV system 120. The EV display image 292 is indexed and registered with the SV image 292 to provide a useful interface for an aircraft operator. In FIG. 5A, the object of interest has been assigned a lower integrity level, such that the focus area for the EV image is larger. In FIG. 5B, the object of interest has been assigned a higher integrity level, such that the focus area for the EV image is smaller.

Figure 6:
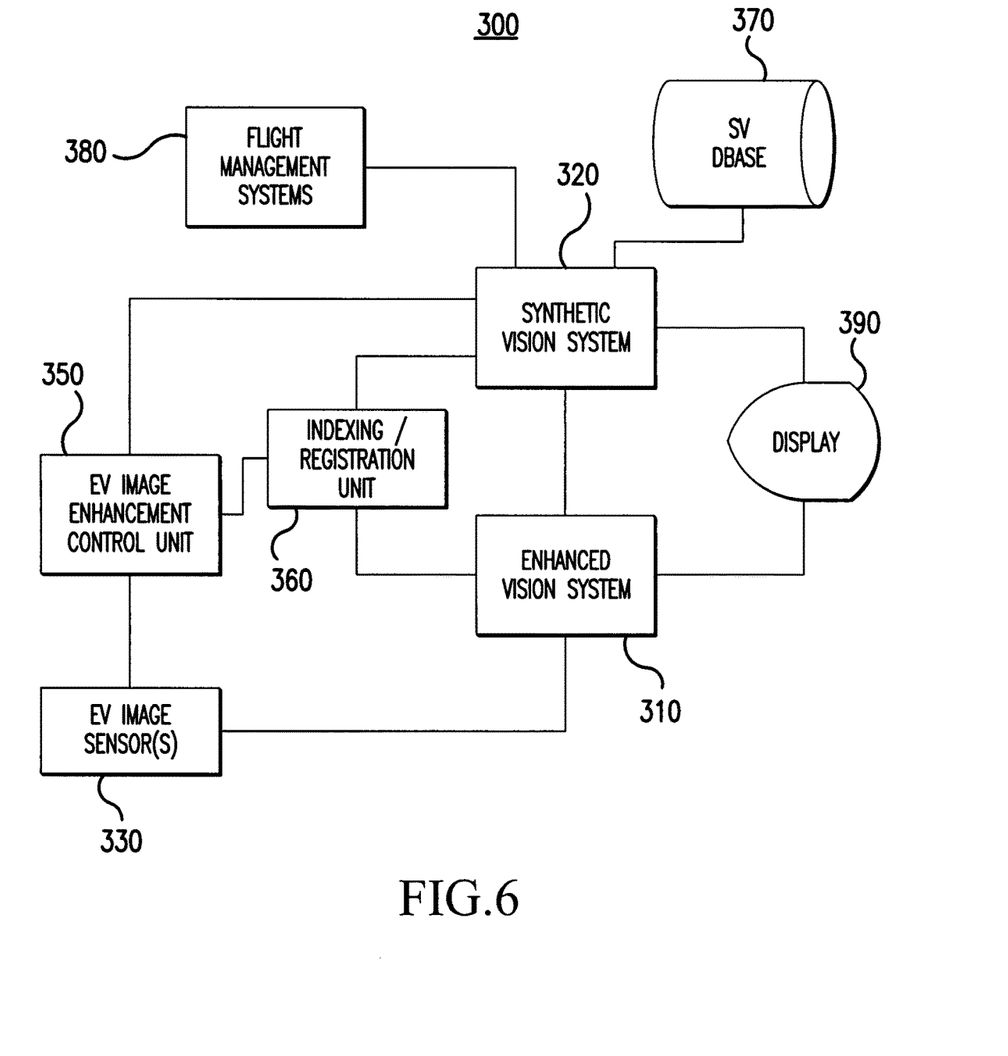
FIG. 6 is a block diagram of a vehicle display system for generating SV and EV display images according to a second embodiment of the present invention.

FIG. 6 illustrates a vehicle display system according to a second embodiment of the present invention. As illustrated in FIG. 6, the vehicle display system 300 includes: a synthetic vision (SV) system 320; an enhanced vision (EV) system 310; an SV database 370; flight management systems 380; enhanced vision (EV) image sensor(s) 330; a display 390; an indexing/registration unit 360; and an EV image enhancement control unit 350. Although various block diagram elements shown in FIG. 6 are illustrated as discrete elements, this illustration is for use and explanation, and it should be recognized that certain elements may be combined in one or more physical devices, e.g., one or more microprocessor(s) with associated software.

Figure 7:
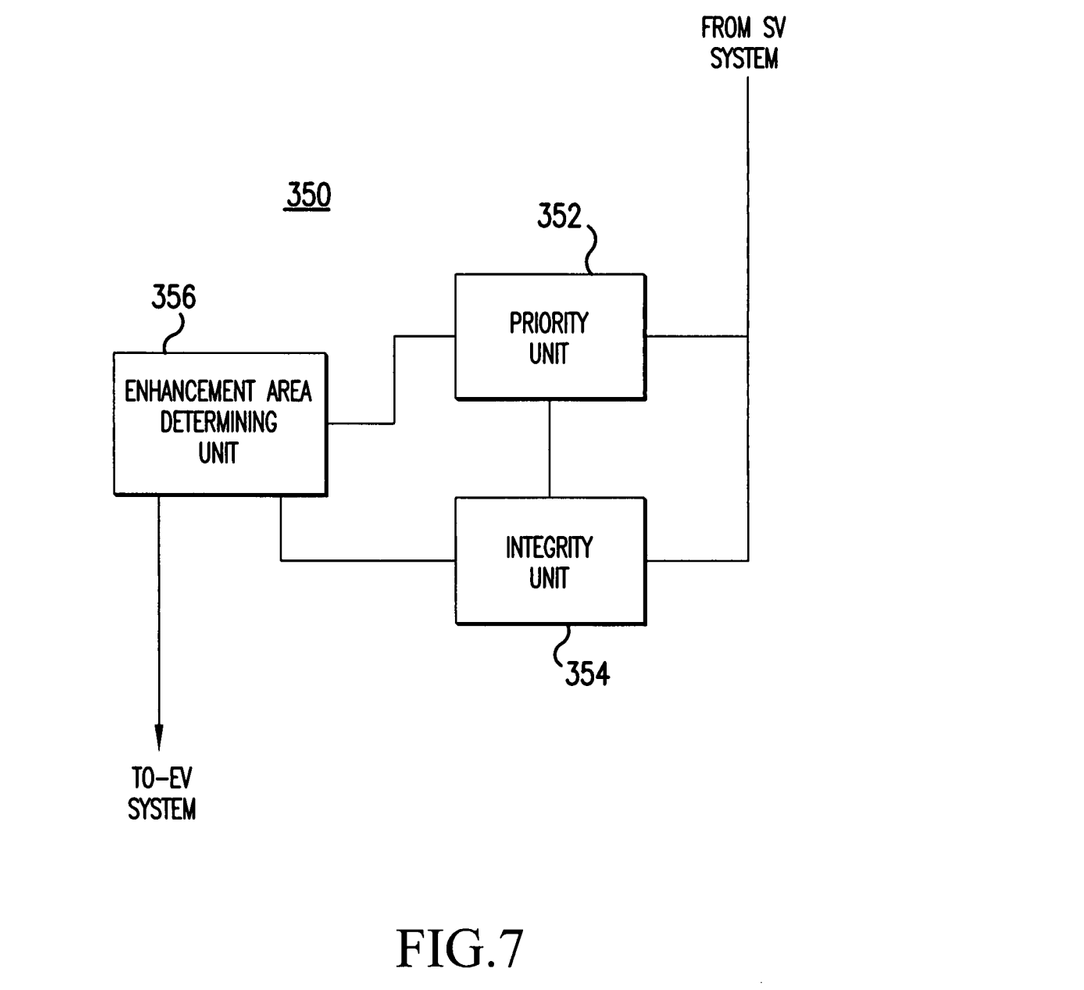
FIG. 7 is a block diagram of an EV image enhancement control unit applied in the vehicle display system of FIG. 6 according to the second embodiment of the present invention.

FIG. 7 is a block diagram illustrating elements of the EV image enhancement control unit 350 according to the second embodiment of the present invention. As illustrated in FIG. 7, the EV image enhancement control unit 350 includes: a priority unit 352; an integrity unit 354; and an enhancement area determining unit 356. The priority unit 352 determines the priority of certain objects of interest based on information from the SV system 120. For example, for EV image sensor 130 having a wide field of view (e.g., 30 degrees), the field of view may contain multiple objects of interest. According to this embodiment of the present invention, priority levels assigned to such objects of interest determine which area of the image generated by the EV image sensor 130 is to be enhanced first to bring out detailed features of the object of interest. The integrity unit 354 determines the integrity level of objects of interest based on information from the SV system 120.

Figure 8:
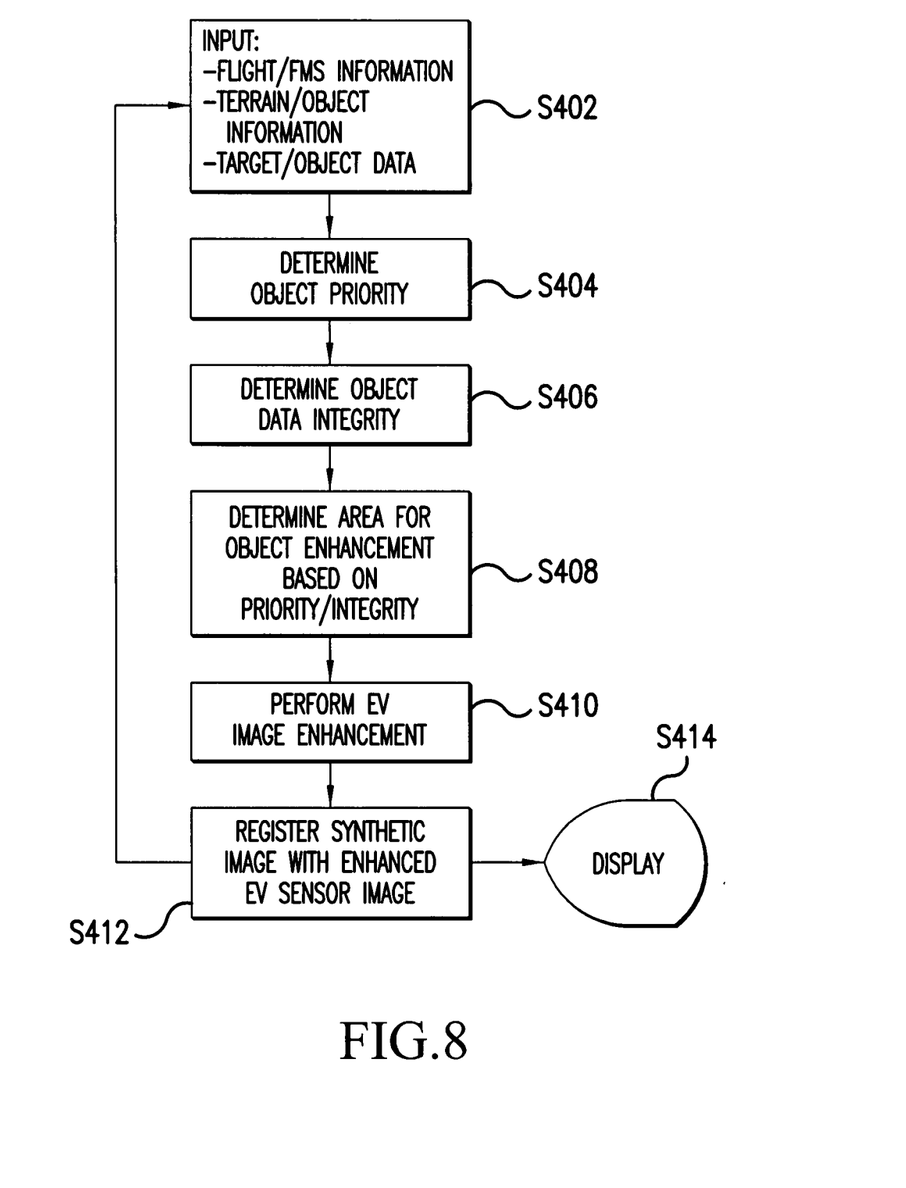
FIG. 8 is a flow diagram illustrating a process for generating a vehicle display with EV and SV images according to the second embodiment of the present invention.

Next, operation of the vehicle display system 300 of the second embodiment illustrated in FIGS. 6 and 7 will be described with reference to the flow diagram of FIG. 8. Initially, the synthetic vision system 320 inputs flight and flight management system (FMS) information, including for example vehicle position, heading, attitude, flight plan, from the flight management systems 380 (step S402). Based on this information, the priority unit 352 of the EV image enhancement control unit 450 determines object priority (step S404). The integrity unit 354 of the EV image enhancement control unit 350 assigns integrity levels to objects of interest (e.g., targets) (step S406). Based on the assigned integrity, the enhancement area determining unit 356 of the EV image enhancement control unit 350 assigns an enhancement area within the field of view of the an EV image sensor 330 (step S408). The EV image enhancement control unit 350 outputs enhancement control signals to the EV system 310 so that image areas of the EV image can be selectively enhanced based on information from the synthetic vision system 320. (step S410). The size of the area for EV image enhancement is a function of object integrity as determined by the integrity unit 354 of the EV image enhancement control unit 350, such that a relatively smaller area can be enhanced/emphasized/highlighted for high integrity objects of interest. The indexing/registration unit 360 aligns the images generated by the EV system 310 and the synthetic vision system 320 for output to the display 390 (step S412) so that an enhanced EV images and SV images are output to the display 390 (step S414).

Figure 9A:
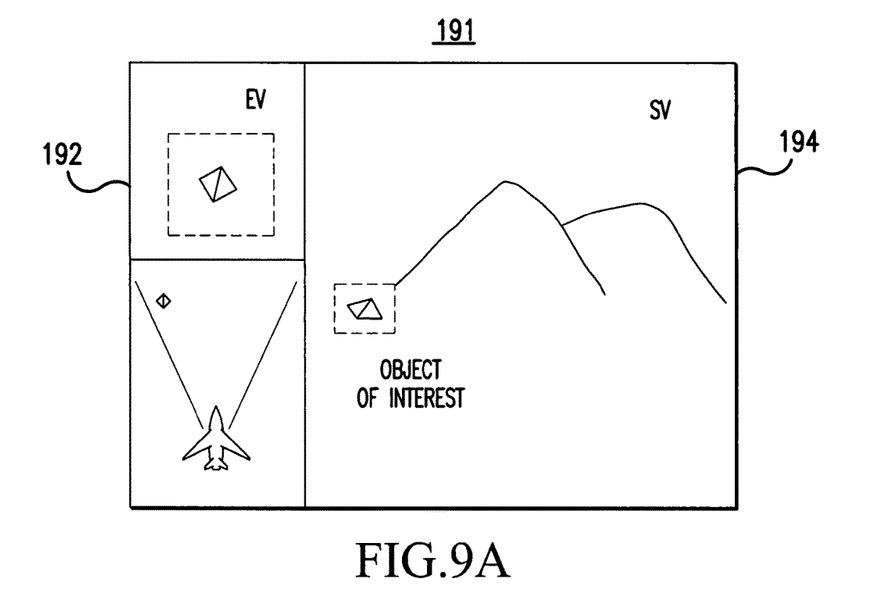
FIGS. 9A and 9B are exemplary vehicle displays with combined EV and SV images according to the second embodiment of the present invention.
Figure 9B:
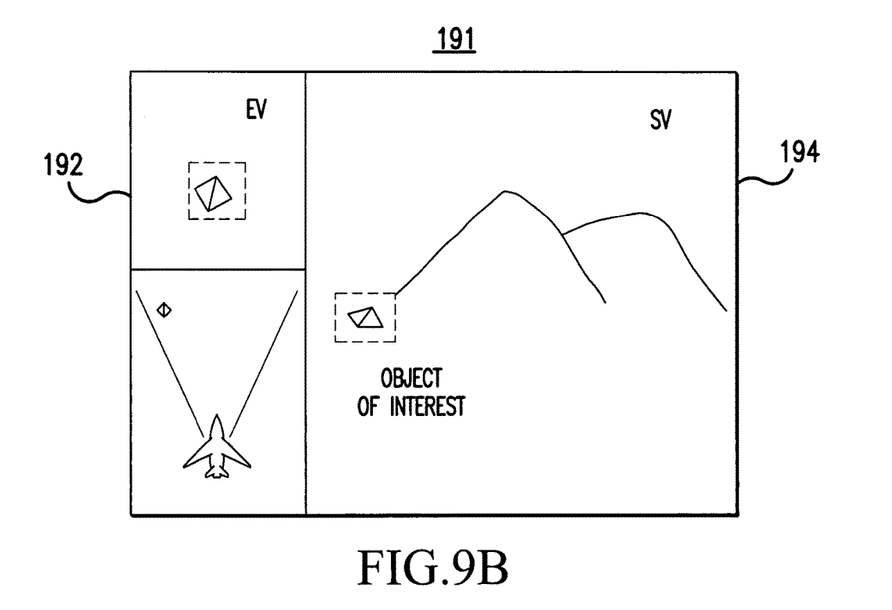

FIGS. 9A and 9B illustrate exemplary display outputs to display 391 according to the second embodiment of the present invention. When applied to an aircraft environment, this embodiment of the present invention provides SV images 394 and EV images 392 that are specifically highlighted/enhanced around the area of the object of interest, whereby such EV image enhancement is performed as a function of object integrity so that a relatively smaller area is enhanced for high integrity objects thereby allowing flight crews to extract object/target information quicker and with improved certainty. In FIG. 9A, the object of interest has been assigned a lower integrity level, such that the enhancement area for the object of interest in the EV view is larger. The enhancement may be a highlighted area (e.g., a color border around the object of interest) or digital image processing to improve the clarity/appearance of the image region containing the object of interest. In FIG. 9B, the object of interest has been assigned a higher integrity level, such that the enhancement area for the object of interest is smaller.

Although detailed embodiments and limitations to the present invention have been described above, it should be apparent that various modifications are possible without departing from the spirit and scope of the present invention.

I claim:

1. An aircraft display system for displaying enhanced vision (EV) and synthetic vision (SV) images to an operator associated with an aircraft, comprising:
    an EV image sensor configured to generate EV images;
    an SV database containing information regarding terrain and objects of interest for a travel path of the aircraft as objects of interest data;
    an SV image generating unit for generating SV images based on travel of said aircraft and information from said SV database;
    a display configured to display images generated by said EV image sensor and said SV image generating unit;
    an EV image sensor control unit configured to control a field of view of said EV image sensor, the EV image sensor control unit comprising:
        a priority unit coupled to the SV database and configured to determine priority levels for the objects of interest, wherein the priority unit selects a first object of interest for display on the display based on the priority levels and the travel path,
        an integrity unit coupled to the SV database and configured to assign integrity levels to the objects of interest, including a first integrity level for the first object of interest, wherein each of the integrity levels is based on a confidence level of the objects of interest data stored in the SV database associated with the respective object of interest, and
        a sensor area optimizing unit coupled to the priority unit and the integrity unit and configured to (i) assign an imaging area within the field of view with an area size based on the first integrity level of the first object of interest and (ii) output steering control signals to the EV image sensor based on the assigned imaging area.

2. The aircraft display system according to claim 1, wherein said display displays SV and EV images side-by-side.

3. The aircraft display system according to claim 2, wherein the SV and EV images are indexed based on objects of interest.

4. The aircraft display system according to claim 1, wherein said EV image sensor is a steerable and/or zoomable Infrared video camera.

5. The aircraft display system according to claim 1, wherein said EV image sensor is a steerable and/or zoomable millimeter-wave video camera.

6. The aircraft display system according to claim 1, further comprising:
    a flight management system configured to provide flight positioning information for said aircraft, wherein
    said SV image generating unit generates said SV images based on flight positioning information from said flight management system.

7. An aircraft display system for displaying enhanced vision (EV) and synthetic vision (SV) images to an operator associated with an aircraft, comprising:
    an EV system with an image sensor configured to generate EV images;
    an SV database containing information regarding terrain and objects of interest for a travel path of the aircraft as objects of interest data;
    an SV image generating unit configured to generate SV images based on travel of said aircraft and information from said SV database;
    a display configured to display images generated by said EV system and said SV image generating unit; and an EV image enhancement control unit configured to control an enhancement of an area of an EV image generated by said EV system, the EV image enhancement control unit comprising:
  a priority unit coupled to the SV database and configured to determine priority levels for the objects of interest, wherein the priority unit selects a first object of interest for display on the display based on the priority levels and the travel path,
  an integrity unit coupled to the SV database and configured to assign integrity levels to the objects of interest, including a first integrity level for the first object of interest, wherein each of the integrity levels is based on a confidence level of the objects of interest data stored in the SV database associated with the respective object of interest, and
  an enhancement area determining unit coupled to the priority unit and the integrity unit and configured to (i) assign an enhancement area within the field of view with an area size based on the first integrity level of the first object of interest and (ii) output enhancement control signals to the EV system based on the assigned imaging area.

8. The aircraft display system according to claim 7, wherein said display displays SV and EV images side-by-side.

9. The aircraft display system according to claim 8, wherein the SV and EV images are indexed based on objects of interest.

10. The aircraft display system according to claim 7, wherein said EV image sensor is a steerable Infrared video camera.

11. The aircraft display system according to claim 7, wherein said EV image sensor is a steerable millimeter-wave video camera.

12. The aircraft display system according to claim 7, further comprising:
  a flight management system configured to provide flight positioning information for said aircraft, wherein
  said SV image generating unit generates said SV images based on flight positioning information from said flight management system.

13. The aircraft display system according to claim 7, wherein
  said EV image sensor is has a wide field of view substantially overlapping an image area for a SV image generated by said SV image generating unit.

14. A method for displaying enhanced vision (EV) and synthetic vision (SV) images to an operator associated with an aircraft, comprising:
  generating EV images using an enhanced vision image sensor;
  accessing an SV database containing information regarding terrain and objects of interest along a travel path of the aircraft as objects of interest data, wherein the SV database further contains object integrity levels associated with the objects of interest data, wherein each of the object integrity levels represents a confidence level in the objects of interest data for each of the objects of interest;
  generating SV images based on travel of said aircraft and information accessed from said SV database;
  controlling a field of view of the EV image sensor or an enhancement area for an EV image generated by the EV image sensor as a function of priority level information from said SV database, wherein the priority level information establishes an order of viewing of the objects of interest and is dynamically assigned based upon a determination of a threat level of each of the objects of interest, wherein the controlling the field of view further includes assigning an imaging area within the field of view with an area size based on the object integrity level for the respective object of interest; and
  a display for displaying images generated by said EV image sensor and said SV image generating unit.

15. The aircraft display system according to claim 1, wherein said display displays the SV and EV images in a fused format.

16. The aircraft display system of claim 1, wherein the display has a display format divided into at least a first portion and a second portion adjacent to one another, and wherein the display is configured to display the SV images in the first portion and the EV images in the second portion.

17. The aircraft display system of claim 16, wherein the display format of the display separates the EV images in the second portion from the SV images in the first portion.

18. The aircraft display system of claim 1, wherein, as each of the integrity levels increases, the respective imaging area within the field of view assigned by the sensor area optimizing unit decreases.

19. The aircraft display system of claim 1, wherein each of the integrity levels is determined by data integrity of the information corresponding to the respective object of interest stored within the SV database.

20. The aircraft display system of claim 7, wherein, as each of the integrity levels increases, the respective enhancement area within the field of view assigned by the sensor area optimizing unit decreases, and wherein each of the integrity levels is determined by data integrity of the information corresponding to the respective object of interest stored within the SV database.

* * * * *